April 29, 1930.                R. DE FILIPPIS                1,756,539
                                  VEHICLE
                            Filed Aug. 5, 1927            2 Sheets-Sheet 1
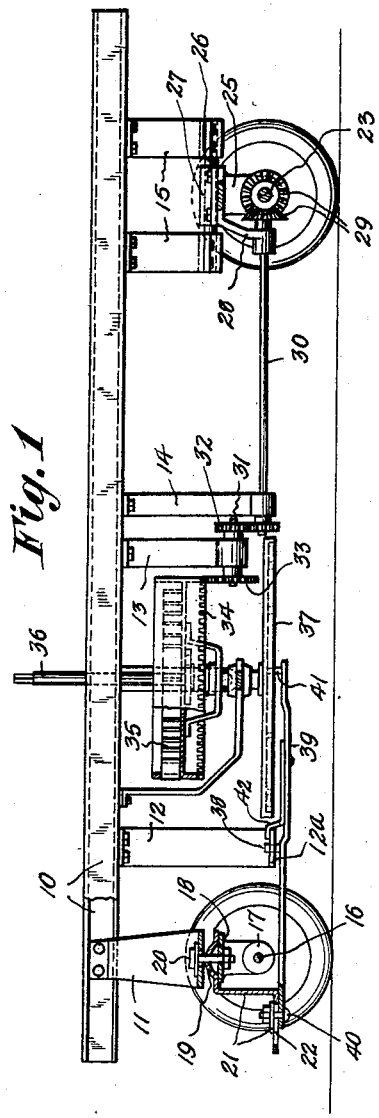
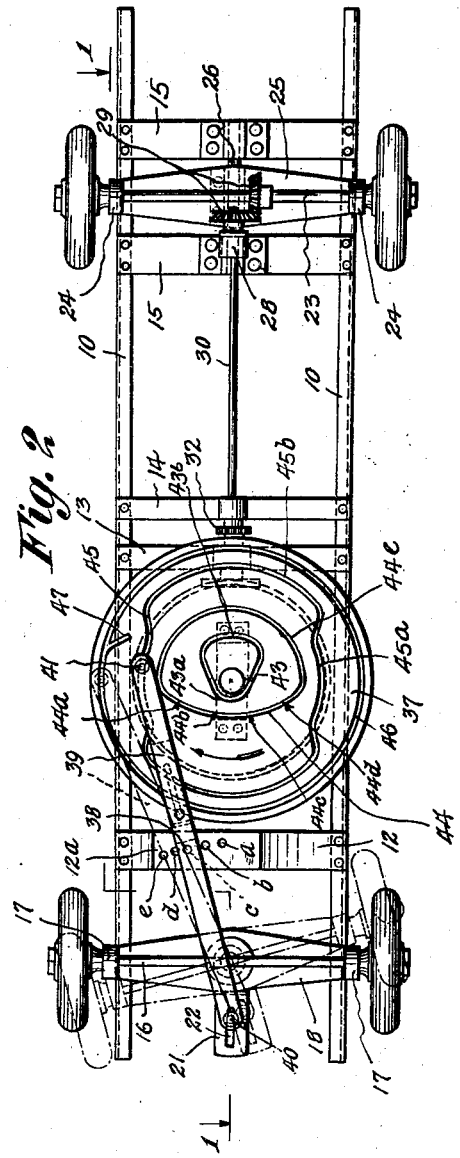

April 29, 1930. R. DE FILIPPIS 1,756,539
VEHICLE
Filed Aug. 5, 1927 2 Sheets-Sheet 2

Patented Apr. 29, 1930

1,756,539

UNITED STATES PATENT OFFICE

RAYMOND DE FILIPPIS, OF BROOKLYN, NEW YORK, ASSIGNOR TO HANNA D. FINDLEY, OF NEW YORK, N. Y.

VEHICLE

Application filed August 5, 1927. Serial No. 210,877.

This invention relates to vehicles, and while it is designed particularly for development along the lines of mechanical toys or toy vehicles, I wish it to be understood that the scope of the invention is not to be limited unnecessarily to toys, for certain features of the improvement are capable of employment in other types of vehicles.

Among the objects of the invention is to provide a vehicle with automatic steering gear so devised and constructed as to produce a variety of results as to direction of movement or behavior of the vehicle according to a considerable range or variety of adjustments, the vehicle being adapted to be operated by any suitable species of power.

Another object of the invention is to improve the axle and chassis construction so as to increase the reliability of the tractive effect of power vehicles, as well as to increase the durability of the machine and the comfort incident to the riding in or upon such machine.

More specifically, one of the objects of the invention is to provide a vehicle having front and rear axles, a pair of wheels on each axle, and connections between the axles and the chassis that will insure not only the desired rotative flexibility of the front axle, but also the capability of relative rocking movement between the front or rear axle and the chassis along an axis substantially parallel to the line of movement of the vehicle.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which Figure 1 is a side elevation of a preferred embodiment of the invention as applied to the vehicle chassis and traction means, with parts in section on the line 1—1 of Fig. 2.

Fig. 2 is a bottom plan view of the construction of Fig. 1, full lines indicating one adjustment of the steering mechanism for straight movement, and broken lines indicating change of position of the steering mechanism while the machine is making a right turn.

Figure 3:
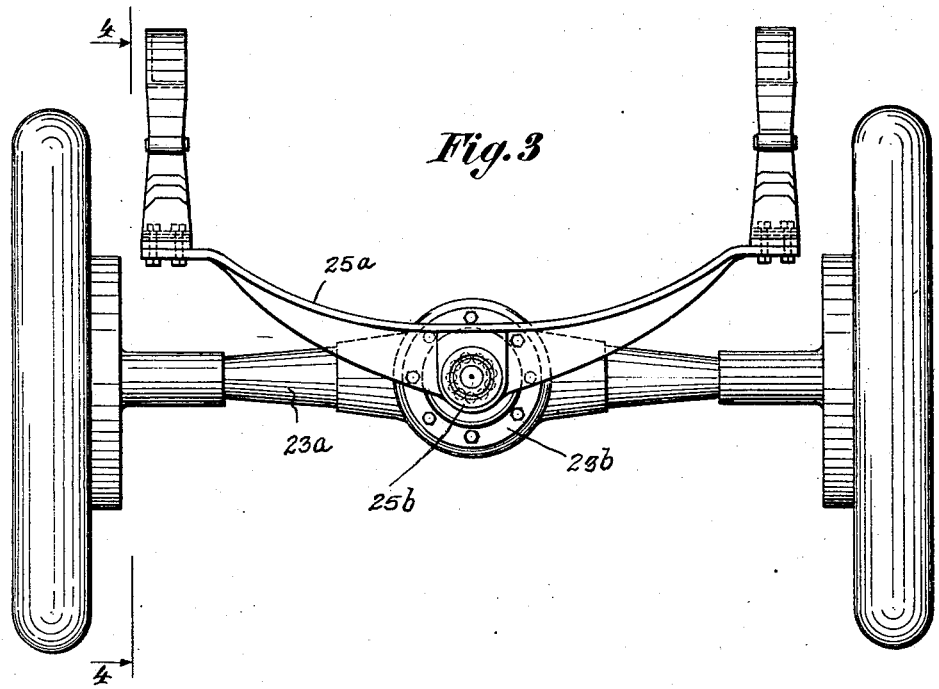
Fig. 3 is a rear elevation of the improved rear axle connection mechanism on an enlarged scale.

Referring now more specifically to the drawings, I indicate as representative of power operated vehicle chassis, a pair of side bars 10 between which extend a series of cross braces or brackets 11, 12, 13, 14, and 15. The number of these cross pieces may be greater or less and the arrangement thereof different from that indicated in the drawings without departing from the spirit of the invention.

The front axle 16 is journaled adjacent to the wheels in bearings 17 fixed to or constituting parts of the bolster 18 having vertical center bearing at 19 through a king pin 20 with the bracket 11. This bearing 19 is so designed as to permit not only the usual rotation around the axis of the king pin, but also a certain limited amount of lateral rocking of the front axle and bolster with respect to the chassis. Extending forward from the bolster 18 and constituting in effect a rigid part thereof is an arm 21 having a forwardly directed slot 22 lying in a vertical plane perpendicular to the vertical plane of the axle 16, but indicated as being below the horizontal plane of the axle.

The rear axle 23 is journaled in bearings 24 adjacent to the wheels and constituting a part of the rear bolster 25. Whereas the usual arrangement is for a rear axle to be more or less rigidly fixed to the rear portion of the chassis, in this instance the bolster 25 is free at its ends from the chassis and is connected by center supporting means including a short sturdy shaft 26 mounted upon the brackets 15 and in a plane parallel to and midway between the rear wheels. The shaft 26 is clamped to the brackets 15 and has journaled between the brackets a sleeve or bearing 27 constituting a part of the bolster structure. A forwardly and downwardly projecting bearing arm 28 is another part of the same structure.

Any suitable means may be provided for the application of power to the traction wheels of the vehicle. As shown herein the rear wheels only are propelling wheels and a pair of miter gears 29 connect the rear axle 23 with the driving shaft 30, the latter being journaled in the bearing 28 at the rear end and in the bracket 14 at the forward end. A counter shaft 31 is journaled in the bracket 13, and a pair of spur gears 32 fixed to the shafts 30 and 31 transmit power from one to the other. The shaft 31 is shown herein as being driven by means of a gear 33 fixed to the forward end of the counter shaft and meshing with a crown gear 34 adapted to be actuated by means of a spiral spring 35 or its equivalent, the power in which is stored by rotation of a key or crank shaft 36 in any well known manner. A steering disk 37 is mounted below the gearing above described and coaxial of the crown gearing. Suitable pawl and ratchet mechanism is provided for connecting the disk 37 operatively with the spring mechanism so that the disk 37 will rotate in unison with the crown gear under the influence of the spring and synchronously with the actuation of the gearing between the crown gear and the driving mechanism.

The bottom portion 12$^a$ of the bracket 12 is flat and provided with a series of selective holes $a$, $b$, $c$, $d$, and $e$ for co-operation with a pin 38 carried by a steering lever 39 whose forward end carries a pivot 40 operating in the slot 22, while the rear end of the lever has a pin 41 co-operating with any selected groove formed in the surface of the disk 37. The connection of the front end of the lever 39 with the front axle structure is permanent although the pin 40 is adapted to glide forward and rearward along the slot 22 during adjustment and operation of the machine. The pin 41 at the rear end of the lever, however, may be withdrawn freely from any groove in which it may be located and placed in any other groove. Likewise the pin 38 at the same time may be placed in any one of the bearing holes $a$ to $e$ inclusive. A spring 42 connected to the lever 39 and engaging over the upper surface of the flat portion 12$^a$ of the bracket 12 is effective to hold the pins 38 and 41 according to the adjustment desired.

The disk 37 is shown provided with a series of four or five grooves, all of which are grouped around the center or axis of the driving mechanism. These grooves are indicated at 43, 44, 45, and 46, and all of them are of compound curvature or in the nature of cams except the last mentioned; but this one is provided with an off-shoot 47, making in effect two grooves instead of one adjacent to the periphery of the disk. The groove 46 considered alone is concentric and circular, while all the others are eccentric and act as cams for at least a portion of rotation of the disk.

The groove 43 comprises two parts, an inner concentric portion 43$^a$ of short radius, and an outer concentric portion 43$^b$ of longer radius. These two arcs 43$^a$ and 43$^b$ are connected by cam grooves so as to make one continuous groove 43. With the front wheels and axle in normal straight-away position and the pin 38 adjusted in the bearing hole $a$, and with the pin 41 adjusted in the groove 43, the driving mechanism being in operation and the disk caused thereby to be rotated in the direction of the arrow in Fig. 2, the vehicle will be moved straight forward during the period corresponding to the time for half rotation of the disk. The pin 41 will then enter one of the cam portions of the groove 43 and the lever 39 will be swung outward from the center of the disk, pivoting around the axis of the pin 38 and causing a right turn of the vehicle, a condition corresponding to that shown in broken lines in Fig. 2. This right turn will continue while the machine makes a half circle on the floor or roadway by which time the pin 41 will have returned to the portion 43$^a$ of the groove, the result being that the machine will then make a return straight movement for a period of time corresponding to the half turn of the disk 37 when it will again make a half circle turn to the right. The adjustment of the lever 39 with the pin 38 in the second hole $b$ and the pin 41 in the groove 44 will produce a continuous figure 8 or a figure equivalent to two circles externally tangent to each other. To produce this result the disk will be so positioned that with the front axle in the position shown in full lines in Fig. 2, the pin 41 will occupy a position substantially at the point 44$^a$. Rotation of the disk will cause the pin 41 to approach the center of the disk and so cause the wheels to make a swinging movement corresponding to a left turn of the vehicle. This turning movement will be completed at about the time the pin reaches the point 44$^b$ and will be continued until the point 44$^c$ is reached at which time the pin 41 will be movable outward from the axis of the disk and completing one of the two circles at about the point 44$^d$, it being understood that the starting point of the figure will be at the point of tangency of the two circles or where the two compound curves cross each other. By this time the wheels are straight again and ready to be given a right turn while the pin 41 passes onward over the crest of the cam and into the concentric portion 44$^e$ of the groove 44 where it will remain until the second circle will be described by the machine and then returned again to its original starting point 44ª. It will thus be apparent that while the two arcs or portions of the groove 44 that are each concentric with the disk are different in extent, they are practically equivalent as to angular movement of the disk so that their times are equal and the resulting figure will be a perfect 8 or two equal tangent circles.

Likewise the adjustment of the lever 39 so as to bring the pin 38 in the third hole and the pin 41 in the groove 45, a condition will obtain according to the showing in full lines in Fig. 2, and with the vehicle making a straight forward movement. The groove 45 includes two pairs of parts 45ª and 45ᵇ, the parts of each pair being of equal radii, and all the parts being concentric. The transition, however, from one part to the next is through a cam connection, hence with the rotation of the disk in the direction shown, the vehicle will make a half turn after the pin 41 passes out of the groove 45ª in which it is at present located, the turning of the vehicle taking place while the pin 41 operates along the portion 45ᵇ or the substantial equivalent of one quarter turn of the disk. At the end of this groove 45ᵇ, the pin will be drawn inward toward the center of the disk and into the groove 45ª and the machine will make another straight run during the period of time corresponding to one quarter rotation of the disk and so on. The grooves 43 and 45 are similar in this that each of them produces a certain straight-away and then a half turn of the vehicle and then again a straight-away, but the groove 45 produces twice as many turns as the one first described.

The directions for the operation of this machine or toy contemplate that in the adjustment of the steering lever with respect to the fulcrum bracket 12 and disk 37 the front axle shall be approximately in the position shown in full lines in Fig. 2. Consequently with the adjustment of the lever with its pin 38 in the fourth hole d, and the pin 41 in the groove 47, the wheels may be set for straight-away, but immediately after the machine starts to move the pin 41 will enter the circular and continuous groove 46 so that the machine will make a constant uniform circle. In effect while the machine is operating the pin 38 has a fixed position, while the pin 41 in most instances is movable inward or outward with respect to the axis of the disk. Also the front axle is caused to swing around its vertical axis during the swinging movements of the lever 39. Therefore it is essential that the slot 22 be provided to accommodate the more or less forward and rearward movements of the pin 40, such movements, however, being secondary to the lateral swinging movement for the turning of the front axle for steering purposes.

Figure 4:
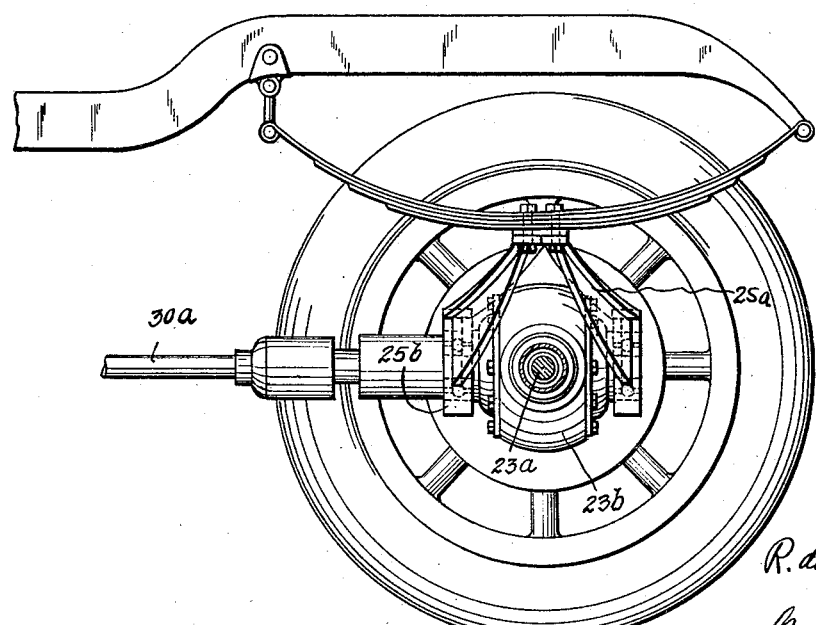
Fig. 4 is a side elevation of the same with parts in section on the line 4—4 of Fig. 3.

In the operation of power driven or traction vehicles, it is essential that both of the driving wheels be maintained in frictional contact with the brake or roadway at all times so as to prevent the spinning of either wheel when running idly out of contact with the track or roadway. Also for the comfort of the riders in the vehicle or safety of the vehicle itself or load carried thereby, it is important that the driving axle shall be free to tilt laterally with respect to the body of the vehicle and around an axis parallel to the line of movement. To this end I mount the rear axle 23 and bolster 25 as described above upon the axle or shaft 26 which permits the rear axle to tilt as just specified and without disturbing materially the normal position or action of the vehicle body or frame and also without disturbing essentially the driving mechanism which is arranged in the same vertical fore and aft plane as the axle and shaft 26. The mechanism shown in Figs. 3 and 4 is a carrying forward of the same idea and illustrated as applicable to practical passenger or truck constructions. In these figures the rear axle 23ª is provided with a housing 23ᵇ for the differential mechanism not shown and with which connects the fore and aft driving shaft 30ª. Associated with the axle and housing is a bolster 25ª shown as split or divided and embracing the housing 23ᵇ on opposite sides and connected therewith through anti-friction bearings 25ᵇ. As shown the entire connection between the bolster and the axle structure is along a line coincident with the axis of the shaft 30ª and midway between and parallel to the planes of the wheels. It follows, therefore, that the rear axle and wheels are comparatively free to tilt up or down around the axis just referred to, thus assuring that the wheels shall be maintained in frictional contact with the roadway at all times and will relieve the vehicle body from a great deal of the effect of rough or uneven roads.

I claim:

A vehicle of the type set forth, including a body, front and rear wheels therefor, an axle for one set of the wheels, said axle being movable about a vertical axis to steer the vehicle, a steering member rotating in synchronism with the wheels of the vehicle, said steering member having a plurality of cams of different design, and means engaging the said axle and a selected one of said cams, said means being resiliently mounted for disengagement with one of the cams and engagement with another of the cams, said axle and said body having coacting brackets to support the body on the axle, and a pin passing through said brackets to form the vertical pivot mentioned, one of said brackets having a convex portion about the pin, said convex portion having bearing relation with the other bracket about the pin, to permit the axle to tilt laterally.

In testimony whereof I affix my signature.

RAYMOND DE FILIPPIS.